US010045225B2

(12) United States Patent
Lotter

(10) Patent No.: US 10,045,225 B2
(45) Date of Patent: Aug. 7, 2018

(54) DETERMINING THE OPTIMUM COVERAGE POSITION IN A BUILDING FOR EXTERNALLY PROVIDED RF SIGNALS

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 0 days.

(21) Appl. No.: 15/227,915

(22) Filed: Aug. 3, 2016

(65) Prior Publication Data

US 2017/0041807 A1 Feb. 9, 2017

Related U.S. Application Data

(60) Provisional application No. 62/200,119, filed on Aug. 3, 2015.

(51) Int. Cl.
*H04W 16/20* (2009.01)
*H04W 24/02* (2009.01)
*H04B 7/155* (2006.01)
*H04W 84/04* (2009.01)

(52) U.S. Cl.
CPC ........ *H04W 16/20* (2013.01); *H04B 7/15507* (2013.01); *H04W 24/02* (2013.01); *H04W 84/047* (2013.01)

(58) Field of Classification Search
CPC ... H04W 16/18; H04W 16/20; H04B 7/15507
See application file for complete search history.

(56) References Cited

U.S. PATENT DOCUMENTS

| 5,668,562 | A | * | 9/1997 | Cutrer | G01R 29/10 342/165 |
|---|---|---|---|---|---|
| 6,625,454 | B1 | | 9/2003 | Rappaport et al. | |
| 7,055,107 | B1 | * | 5/2006 | Rappaport | H04L 41/145 703/1 |
| 7,110,768 | B1 | * | 9/2006 | Bridges | H04W 16/18 455/446 |
| 8,718,541 | B2 | * | 5/2014 | Li | H04B 7/2606 342/353 |
| 2003/0073442 | A1 | * | 4/2003 | Fattouch | H04W 16/18 455/466 |
| 2004/0143428 | A1 | * | 7/2004 | Rappaport | G06F 17/509 703/22 |
| 2004/0203889 | A1 | * | 10/2004 | Karaoguz | H04L 29/06 455/456.1 |
| 2005/0282540 | A1 | * | 12/2005 | Motamedi | H04W 16/18 455/423 |
| 2006/0046646 | A1 | * | 3/2006 | Couper | H04B 7/155 455/11.1 |
| 2006/0205343 | A1 | * | 9/2006 | Runyon | H04B 7/15542 455/11.1 |
| 2007/0088709 | A1 | * | 4/2007 | Bailey | G06F 3/04815 |

(Continued)

FOREIGN PATENT DOCUMENTS

EP 2741535 A1 6/2014

*Primary Examiner* — Nathan Mitchell
(74) *Attorney, Agent, or Firm* — Mintz Levin Cohn Ferris Glovsky and Popeo, P.C.

(57) ABSTRACT

A system and method are disclosed for determining a location to position an RF signal repeater within a structure, based on the position having the highest probability of being the location of the highest probable RF signal strength.

20 Claims, 2 Drawing Sheets

(56) References Cited

U.S. PATENT DOCUMENTS

Figure 1:
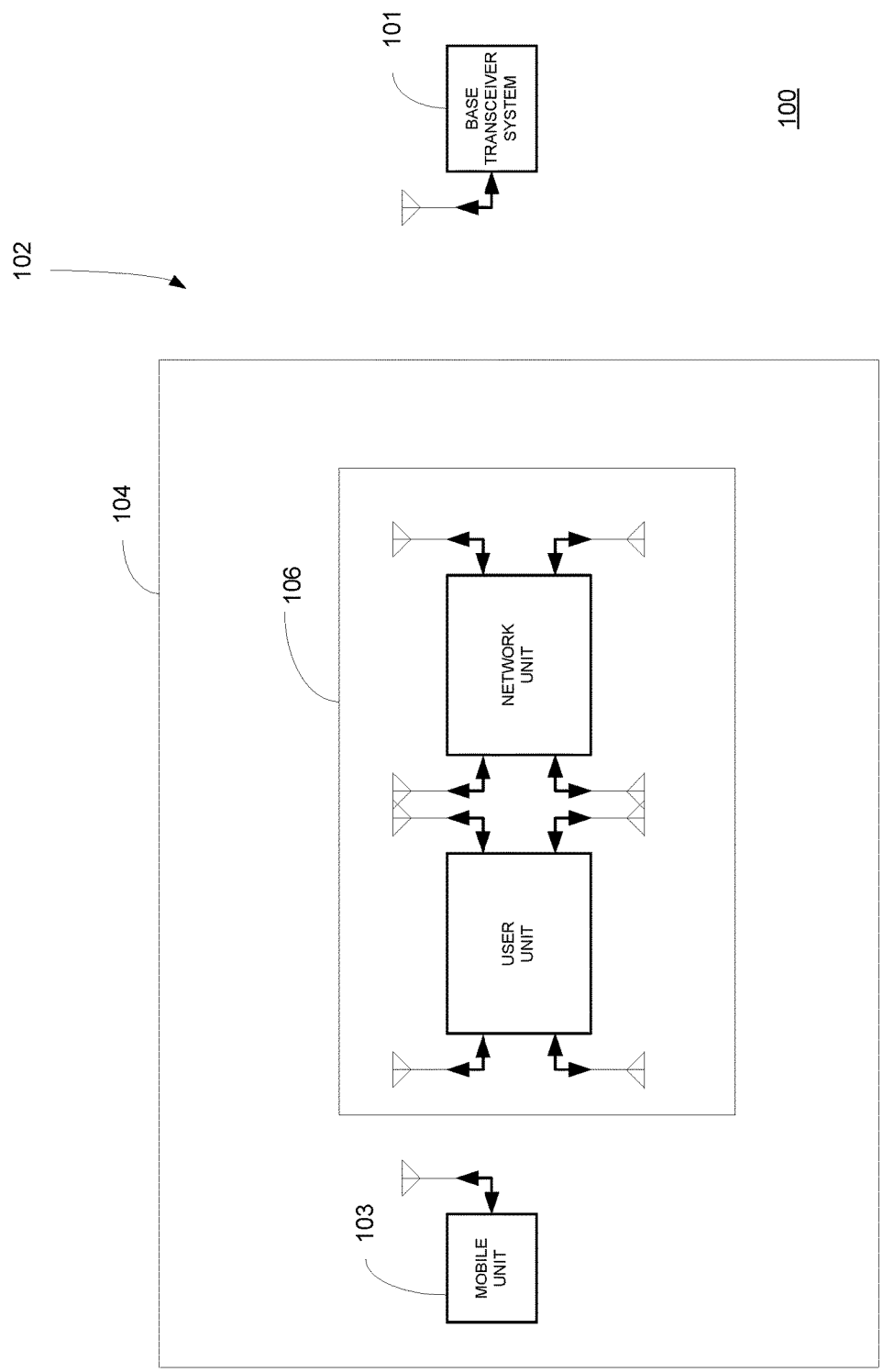

| | | | |
|---|---|---|---|
| 2008/0039016 A1* | 2/2008 | Bonta | H04B 7/2606 |
| | | | 455/41.2 |
| 2011/0035191 A1* | 2/2011 | Roh | H04B 17/309 |
| | | | 703/1 |
| 2012/0230206 A1* | 9/2012 | Baliga | H04W 16/18 |
| | | | 370/243 |
| 2014/0244817 A1 | 8/2014 | Pulleti et al. | |
| 2015/0341502 A1* | 11/2015 | Udeshi | H04M 15/58 |
| | | | 455/405 |

* cited by examiner

DETERMINING THE OPTIMUM COVERAGE POSITION IN A BUILDING FOR EXTERNALLY PROVIDED RF SIGNALS

CROSS-REFERENCE TO RELATED APPLICATION

This application claims the benefit of U.S. Provisional Application Ser. No. 62/200,119, filed on Aug. 3, 2015 and titled "DETERMINING THE OPTIMUM COVERAGE POSITION IN A BUILDING FOR EXTERNALLY PROVIDED RF SIGNALS," the disclosure of which is incorporated by reference in its entirety.

TECHNICAL FIELD

The subject matter described herein relates to determining the optimum position for wireless coverage inside a building.

BACKGROUND

Wireless signals can be affected by the structure of a building. This is particularly true for cellular wireless signals. Positioning a wireless signal repeater, such as a cellular signal repeater inside or near the building can improve the wireless signal coverage in the building.

SUMMARY

Knowing where in a home or business the best cellular coverage is can be important in a number of different cases. For example, when a cellular signal router, such as an LTE router, is used as a repeater to provide Internet access to a home, the best location for the LTE router is in the part of the home that has the best LTE signal coverage. This can help provide ensure the highest throughput achievable. As another example, when a signal booster is deployed in a home, the donor antenna for the signal booster should be placed in the area of the home with the best signal coverage.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, determining the optimum position inside a position to position a cellular signal repeater.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a software system, software architecture, or software/hardware architecture, it should be readily understood that such features are not intended to be limiting. The claims that follow this disclosure are intended to define the scope of the protected subject matter.

DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 illustrates a wireless repeater being located within a structure of a building to communicate signals between an external base station and a mobile unit.

Figure 2:
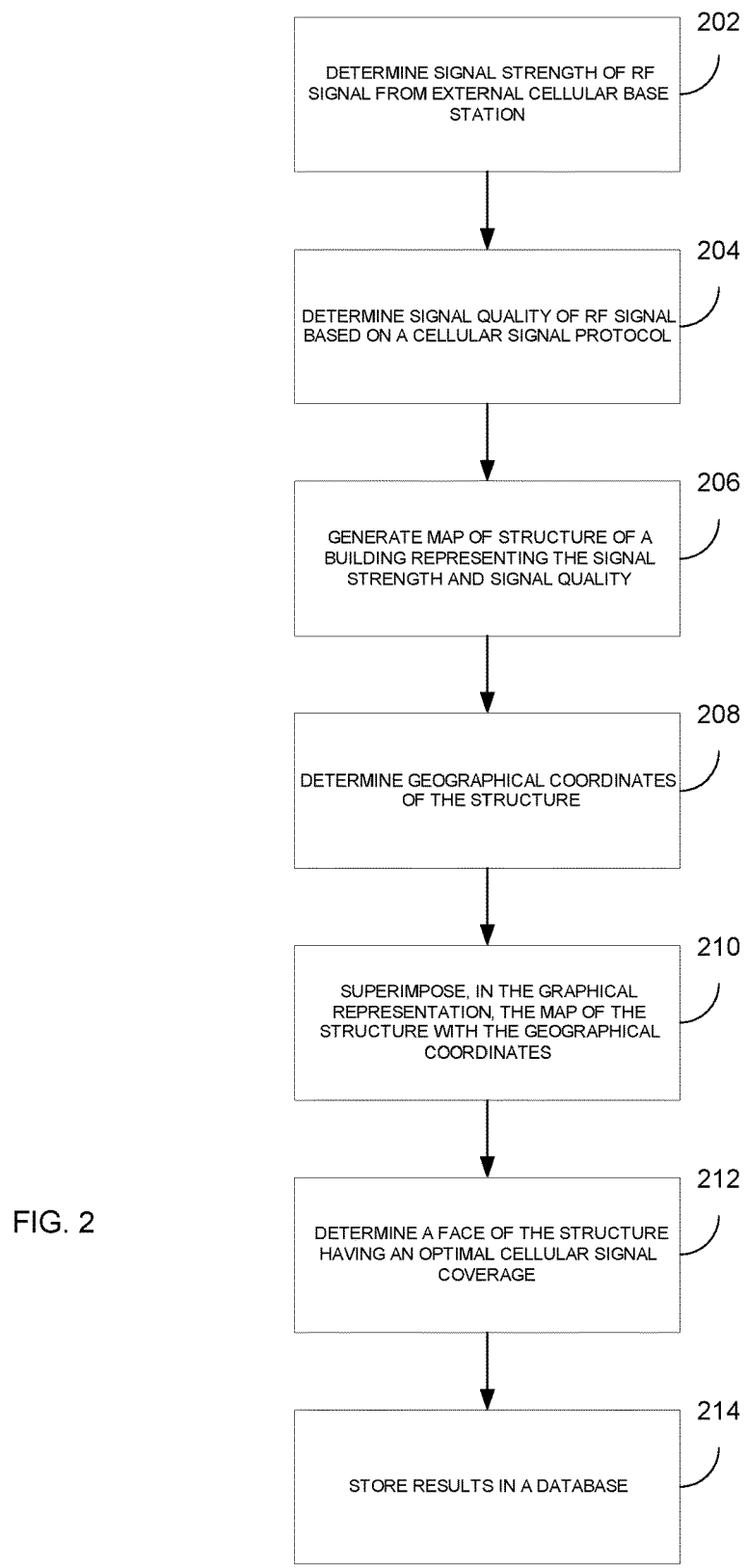

FIG. 2 is a flowchart of a method for determining an optimal coverage point in a building for a wireless repeater.

When practical, similar reference numbers denote similar structures, features, or elements.

DETAILED DESCRIPTION

Determining a position in a building with the highest cellular coverage, such as LTE coverage, can provide a number of benefits. Providing a cellular repeater, such as an LTE router, at the location of the highest cellular signal within the building can assist in providing the highest possible level of coverage throughout the rest of the building. While the description herein describes LTE signals, this disclosure is applicable to all wireless signal types. Such signal types include, but are not limited to LTE, GSM, CDMA, 3G, MM, MM, RR, BSMAP, GPRS, EDGE, UMTS, TDMA, and/or other cellular signal types and/or protocols.

An LTE router, used as a repeater, can provide Internet access through the LTE network to parts of the building that otherwise would not have sufficient LTE signal strength. Placing the LTE router at the location of the highest LTE signal level within the building can facilitate providing LTE coverage to more of the building than would otherwise be achievable. When a signal booster, or signal repeater, is deployed in a building, the donor antenna for the signal booster/repeater should be placed in the area of the home with the best signal coverage.

The position for a cellular repeater is typically determined by using a handset associated with that cellular signal/protocol and walking through the building while noting the number of signal bars being displayed on the handset. The more signal bars the phone shows, the stronger the signal, and consequently, the better the location for positioning the repeater. However, current implementations of the signal bars on a handset do not necessarily reflect signal strength. For example the popular iPhone as well as the Samsung Galaxy S6 smartphones use signal quality to drive the number of bars being displayed. Signal quality is influenced by a number of factors such as interference and not only signal strength. Therefore, it is not feasible to use a handset to find the best coverage spot. As an alternative, some handsets will now allow a special code to be entered into the phone to allow for the signal bars to represent signal strength only and not other factors as well. Such a solution is extremely cumbersome. Special test handsets with test software can be used to get detailed RF signal strength data. Such tools are reserved for profession RF installers.

FIG. 1 illustrates a system 100 that includes a building 102 defined by a structure 104. The structure 104 can have any number of walls, ceilings, floors, etc. Within the structure, a wireless repeater 106 is located, an preferably located according to the methods described herein, to take advantage of an optimal position relative to signal strength, signal quality, and other factors of RF communications between a base transceiver system 101 and a mobile unit 103 located within or proximate to the structure 104 of the building 102.

A system and method is provided to calculate a location within a building at which to place a wireless repeater. The system uses signal strength from an external cellular-signal base station and also signal quality data. The system can include a database that includes strength measurements at specific geographic locations for particular cellular-signal protocols. The information provided in the database can be translated into a cellular signal "heat map." Such "heat maps" can show the coverage signal levels at specific coordinates. An example of such a heat map service is the offering from www.sensorly.com.

The system can be configured to determine the geographical coordinates, such as GPS coordinates, and/or the address of the structure to be analyzed. The structure position and orientation can be obtained from publically available databases. Such databases can be databases that include image information and location information. One such database includes Google Earth. The position and orientation data of the structure to be analyzed can be superimposed on the heat map data. The face of the structure that has the highest probability to have the best cellular signal coverage for the particular cellular signal/protocol can be determined based on the size, position and orientation of the building and the heat map data.

Geographic information can be taken into account when determining which face of the structure can have the highest probability of having the best cellular signal coverage. Natural and man-made impediments to the signal can be determined. For example, man-made impediments to signal strength and/or quality can include buildings, bridges, and/or other man-made structures. Natural impediments to signal strength can include hills, mountains, out-cropping's, cliff faces, trees and/or other natural impediments. The man-made and natural impediments to signal strength/quality can be determined based on images taken of the ground, database entries, geographic survey information and/or other information. Signal impediments can be any impediment to radio-frequency signals.

The system can be configured to initiate one or more processes to identify the face of the structure having the highest probability of having the highest signal strength to a user of the system. The process can be configured to receive, as inputs to determine which face of the structure has the highest probability of having the highest signal strength: the geographic location of a structure; the orientation of the structure; geographical and physical RF signal impairment structures; average measured RF signal strengths (typically from either network provided data or crow soured data) for a particular RF signal; specific signal strengths for specific cell towers within range of the structure; and cell tower locations.

The process described herein can be implemented on a computing system with an RF transceiver that is configured to provide an indication to users of the face of a structure having the highest probability of the highest RF signal strength from one or more external base stations. The process can be configured to indicate the most probable area in a structure where the coverage is most likely the best position for positioning a RF signal repeater.

The structure being analyzed can be displayed relative to a map or a satellite image of the geographic area where the structure is located. The determined location for the RF signal repeater can be displayed relative to the map or satellite image.

The signal strength of the RF signal can be measured at the determined location for the RF signal repeater. The measured signal strength can be provided to the signal strength database. When the RF signal repeater is deployed in the structure, the RF signal strength as measured by the RF signal repeater can be uploaded to the RF signal provider and maintained at a signal strength database.

FIG. 2 is a flowchart of a method for determining an optimal coverage point in a building for a wireless repeater. At 202, a signal strength of an RF signal from an external cellular base station is determined. The base station is external to the structure of a building in which a wireless repeater is to be located. The signal strength can be measured by a computer having an RF transceiver. At 204, a signal quality is determined, based on a cellular signal protocol employed by the base station. The computer can store specifications of the protocol and determine the quality against the specifications.

At 206, the computer generates a map of the building to represent the signal strength and signal quality. At 208 the computer determines the geographic coordinates of the structure that defines the buildings. Such coordinates can be obtained from available databases. At 210, the computer superimposes the graphical representation of the map of the structure with the geographical coordinates, to determine, at 212, a face or other feature of the structure having the optimal cellular signal coverage. At 214, the results are stored in a database, for access and use by the computer for future installations of a wireless repeater.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of calculating a location within a building at which to place a wireless repeater, the building having a structure, the method comprising:

determining, by a computing system and via an RF transceiver, a signal strength of an RF signal from an external cellular base station at each of a plurality of locations within the structure of the building;

determining, by the computing system at each of the plurality of locations within the structure, a signal quality of the RF signal, the signal quality being based on at least one of a plurality of cellular signal protocols;

determining, by the computing system, geographical coordinates that define the structure of the building;

superimposing, by the computing system, the geographical coordinates of the structure on a map of the structure that provides a graphical representation of the signal strength and signal quality of the RF signal;

determining, by the computing system, at least one face of the structure having an optimal cellular signal coverage based on the at least one cellular signal protocol, a size of the structure, a position of the structure, an orientation of the structure, and the signal quality; and generating, by the computing system, the map of the structure that provides a graphical representation of the signal strength and signal quality of the RF signal from the external cellular base station, the graphical representation including a depiction of the location within the building at which to place the wireless repeater.

2. The method in accordance with claim 1, wherein the face of the structure is defined by the size, the position and the orientation.

3. The method in accordance with claim 2, further comprising storing, by the computing system, the size, the position and the orientation in a database associated with the computing system.

4. A computer program product comprising a non-transitory machine-readable medium storing instructions that, when executed by at least one programmable processor, cause the at least one programmable processor to perform operations comprising:

determining, via an RF transceiver, a signal strength of an RF signal from an external cellular base station at each of a plurality of locations within a structure of a building;

determining, at each of the plurality of locations within the structure, a signal quality of the RF signal, the signal quality being based on at least one of a plurality of cellular signal protocols;

determining, by the computing system, geographical coordinates that define the structure of the building;

superimposing, by the computing system, the geographical coordinates of the structure on a map of the structure that provides the graphical representation of the signal strength and signal quality of the RF signal;

determining, by the computing system, at least one face of the structure having an optimal cellular signal coverage based on the at least one cellular signal protocol, a size of the structure, a position of the structure, an orientation of the structure, and the signal quality; and generating the map of the structure that provides the graphical representation of the signal strength and signal quality of the RF signal from the external cellular base station, the graphical representation including a depiction of the location within the building at which to place the wireless repeater.

5. A system comprising:

an RF transceiver; and a computing system coupled with the RF transceiver, the computing system having a non-transitory machine-readable medium storing instructions that, when executed by at least one programmable processor, cause the at least one programmable processor to perform operations comprising:

determine, via the RF transceiver, a signal strength of an RF signal from an external cellular base station at each of a plurality of locations within a structure of a building;

determine, at each of the plurality of locations within the structure, a signal quality of the RF signal, the signal quality being based on at least one of a plurality of cellular signal protocols;

determine, by the computing system, geographical coordinates that define the structure of the building;

superimpose, by the computing system, the geographical coordinates of the structure on a map of the structure that provides the graphical representation of the signal strength and signal quality of the RF signal;

determine, by the computing system, at least one face of the structure having an optimal cellular signal coverage based on the at least one cellular signal protocol, a size of the structure, a position of the structure, an orientation of the structure, and the signal quality; and generate the map of the structure that provides the graphical representation of the signal strength and signal quality of the RF signal from the external cellular base station, the graphical representation including a depiction of the location within the building at which to place the wireless repeater.

6. The method of claim 1, wherein the geographical coordinates are graphical positioning system (GPS) coordinates.

7. The method of claim 1, wherein the geographical coordinates are an address of the building.

8. The method of claim 1, further comprising:

obtaining the position and the orientation from a database, the database including image information and location information of the building.

9. The method of claim 1, further comprising:

placing a donor antenna of the wireless repeater on the determined face of the structure.

10. The method of claim 1, further comprising:

determining man-made and natural impediments to signal strength or quality based on images taken of the ground, the images retrieved from a database.

11. The method of claim 1, wherein determining the at least one face of the building is performed using at least: the geographic location of the building; the orientation of the building; geographical and physical RF signal impairment structures; average measured RF signal strengths for a particular RF signal; signal strengths for cell towers within range of the building; and cell tower locations.

12. The method of claim 1, further comprising:

uploading measured RF signal strength to an RF signal provider and maintained at a signal strength database.

13. The system in accordance with claim 5, wherein the face of the structure is defined by the size, the position and the orientation.

14. The system in accordance with claim 13, the operations further comprising storing, by the computing system, the size, the position and the orientation in a database associated with the computing system.

15. The system of claim 5, wherein the geographical coordinates are graphical positioning system (GPS) coordinates.

16. The system of claim 5, wherein the geographical coordinates are an address of the building.

17. The system of claim 5, the operations further comprising:

obtaining the position and the orientation from a database, the database including image information and location information of the building.

18. The system of claim 5, the operations further comprising:

determining man-made and natural impediments to signal strength or quality based on images taken of the ground, the images retrieved from a database.

19. The system of claim 5, wherein determining the at least one face of the building is performed using at least: the geographic location of the building; the orientation of the building; geographical and physical RF signal impairment structures; average measured RF signal strengths for a particular RF signal; signal strengths for cell towers within range of the building; and cell tower locations.

20. The system of claim 5, the operations further comprising:

uploading measured RF signal strength to an RF signal provider and maintained at a signal strength database.

* * * * *